United States Patent [19]

Ward

[11] Patent Number: 4,875,015

[45] Date of Patent: Oct. 17, 1989

[54] MULTI-ARRAY BOREHOLE RESISTIVITY AND INDUCED POLARIZATION METHOD WITH MATHEMATICAL INVERSION OF REDUNDANT DATA

[75] Inventor: Stanley H. Ward, Salt Lake City, Utah

[73] Assignee: University of Utah Research Institute, Salt Lake City, Utah

[21] Appl. No.: 221,279

[22] Filed: Jul. 19, 1988

Related U.S. Application Data

[63] Continuation-in-part of Ser. No. 75,690, Jul. 20, 1987, abandoned.

[51] Int. Cl.$^4$ .......................... G01V 3/00; G01V 3/08; G01V 3/18; G01V 3/38
[52] U.S. Cl. .................................. 324/323; 324/334; 324/338; 324/346; 324/357; 324/362; 324/366; 324/372; 364/422
[58] Field of Search ............... 324/334, 335, 338, 339, 324/357–364, 366, 370, 372; 364/420, 422

[56] References Cited

U.S. PATENT DOCUMENTS

| | | | |
|---|---|---|---|
| 2,211,124 | 8/1940 | Jakosky | 324/357 X |
| 2,575,349 | 11/1951 | Lee | 324/370 |
| 2,599,688 | 6/1952 | Brant | 324/372 |
| 2,708,261 | 5/1955 | Thompson | 324/357 |
| 4,296,379 | 10/1981 | Yoshizumi | 324/357 |
| 4,393,350 | 7/1983 | Hansen et al. | 324/334 |
| 4,401,372 | 8/1977 | Miller et al. | 324/362 X |
| 4,616,184 | 10/1986 | Lee et al. | 324/335 |
| 4,633,182 | 12/1986 | Dzwinel | 324/335 |
| 4,703,279 | 10/1987 | Chapman et al. | 324/366 |
| 4,752,881 | 6/1988 | Griffiths | 324/354 X |

FOREIGN PATENT DOCUMENTS

1078388  3/1984  U.S.S.R. ............... 324/372

*Primary Examiner*—Gerard R. Strecker
*Attorney, Agent, or Firm*—Trask, Britt & Rossa

[57] ABSTRACT

Multiple arrays of electric or magnetic transmitters and receivers are used in a borehole geophysical procedure to obtain a multiplicity of redundant data suitable for processing into a resistivity or induced polarization model of a subsurface region of the earth.

22 Claims, 17 Drawing Sheets $$\rho_a = \frac{2\pi V}{I\left[\frac{1}{r_1} - \frac{1}{r_2} - \frac{1}{r_3} + \frac{1}{r_4}\right]}$$

MULTI-ARRAY BOREHOLE RESISTIVITY AND INDUCED POLARIZATION METHOD WITH MATHEMATICAL INVERSION OF REDUNDANT DATA

RELATED APPLICATION AND THIRD-PARTY RIGHTS

This application is a continuation-in-part of commonly assigned Serial No. 075,690, filed July 20, 1987, (now abandoned) the disclosure of which is incorporated herein.

The inventions disclosed by both this application and the parent application were made with government support under Contract No. DE-AC03-84SF12196 awarded by the Department of Energy. The government thus has certain rights with respect to said inventions.

This application is a continuation-in-part of commonly assigned Ser. No. 75,690, filed July 20, 1987, (now abandoned) the disclosure of which is incorporated herein.

BACKGROUND OF THE INVENTION

1. Field

This invention relates to borehole geophysics and inverse geophysical modeling techniques. It provides a method for adapting borehole geophysical techniques to accumulate a mass of redundant resistivity data for inverse mathematical processing into either two-dimensional or three-dimensional models of subsurface resistivity structures.

2. State of the Art

Electrical resistivity surveys are used routinely in geothermal, mineral, coal, groundwater and engineering applications. They are also used in connection with oil and gas exploration. They have recently been used for sensing buried wastes and waste migration.

Resistivity surveys are capable of mapping overburden, depth, dip, depth extent, strike, stratigraphy, faults, fractures, ore deposits, rock units, saltwater intrusion, contaminant plumes, landfills, voids and other subsurface features.

The induced polarization method (which involves applying a potential difference between spaced electrodes) was developed for detecting small concentrations of disseminated mineralization (a target) in base metal exploration. This method has also found limited use for detecting other exploration targets, e.g., in groundwater exploration, geotechnical and environmental applications.

Surface methods (those which rely upon the placement of apparatus at various locations on the surface of the earth) typically suffer from limited depth of penetration and spatial resolution, particularly when the target is deeply buried. Techniques which utilize a borehole within or near an exploration target offer increased depth of penetration and improved vertical and lateral resolution, provided borehole conditions, physical property contrasts, and geological conditions are favorable. Among other reasons, the economic advantages of increased vertical resolution and target discrimination have provided an impetus for improving borehole instrumentation, survey techniques, and the numerical computation of various target responses.

The economic subsurface development of geothermal systems, mineral deposits, oil and gas fields, and groundwater is critically dependent upon a cost-effective drilling program and the successful delineation of a target zone (e.g., fracture zones) within a large region. With existing electrical geophysical methods, satisfactory delineation of such subterranean features is not easily achieved. Reliable delineation of subsurface features associated with landfills, saltwater intrusion, chemical contaminant plumes and voids is of major environmental concern.

The resistivity of a conductor, determined by measuring the potential between two electrodes when a known current is impressed through the conductor, may be expressed by the equation:

$$\rho = K \cdot V/I \quad (1)$$

where:
V represents the potential drop in volts across the conductor;
I represents the current flow in amperes through the conductor; and
K is a constant reflecting the geometry of the conductor and the electrode positions.

Equation (1) is readily applied to simple conductors of homogeneous properties, but becomes very complicated in the case of non-homogeneous regions of the earth. It is well recognized that the impressed potential which can be measured in a geophysical survey reflects the apparent resistivity of the earth along the path of the current impressed between and about two spaced current electrodes. An apparent resistivity value can be calculated for any two potential electrodes when the potential drop (V) is measured for a known impressed current (I) between two current electrodes, provided the relative positioning of the electrodes is known. The simple-case calculation assumes a homogeneous earth. Given that assumption, apparent resistivity is determined by the following equation:

$$\rho a = \frac{2\pi}{[1/r_1 - 1/r_2 - 1/r_3 + 1/r_4]} V/I \text{ where} \quad (2)$$

$\rho a$ is the apparent resistivity of the earth between two potential electrodes; and
$r_1$, $r_2$, $r_3$, and $r_4$ are measured distances between the respective current and potential electrodes according to a prescribed convention, wherein $r_1$ is the distance between a positive current electrode and a first potential electrode, $r_2$ is the distance between that positive current electrode and a second potential electrode, $r_3$ is the distance between a negative current electrode and the first potential electrode, and $r_4$ is the distance between that negative current electrode and the second potential electrode.

A distinction exists between electrical well-logging and electrical borehole geophysical survey techniques. Electrical well-logging typically involves the use of several electrodes, spaced a fraction of a meter to several meters apart, located on a sonde. The sonde is lowered into a single well or borehole, and exploration is made of an annulus surrounding the well. The annulus has a radius ranging from a fraction of a meter to tens of meters. In borehole geophysical survey procedures, electrodes of widely varying separation are disposed variously in one or more boreholes and also at the surface of the earth. The exploration range from a single borehole may exceed 100 meters, while exploration between boreholes may exceed several hundreds of meters.

There are several known modes of electrical borehole geophysical surveying. By the convention followed in this disclosure, the location of the energizing (current) electrode is first designated, followed by the location of the measurement (potential) electrodes. Thus, in the surface-to-borehole method, the energizing electrodes are disposed at horizontal locations on the surface of the earth with only potential electrodes lowered to occupy numerous vertical locations down one or more boreholes. In the borehole-to-surface method, the energizing electrodes occupy one or more vertical locations in a borehole while the potential electrodes occupy numerous horizontal locations on the surface of the earth. In the cross-borehole method, the energizing electrodes occupy one or more vertical locations down one borehole while the potential electrodes occupy one or more vertical locations down one or more additional boreholes. Where a subsurface mine working or other cavity is available for disposition of current electrodes, with the potential electrodes at surface, a drift-to-surface method becomes available. When the current electrodes are at the surface and the potential electrodes are in the mine working or other cavity, then a surface-to-drift method becomes available. By analogy, boreholes or mine shafts afford drift-to-borehole or borehole-to-drift arrangements.

These known survey techniques offer improved lateral and vertical resolution and increased depth of exploration compared to surface techniques and to well-logging techniques. Nevertheless, each of the aforedescribed configurations of electrodes is limited in its ability to provide sufficient data to yield maximum vertical and horizontal resolution of subsurface bodies via use of equation (2).

When all four $1/r_n$ terms in equation (2) are of comparable value, the electrodes are considered to be placed in the dipole-dipole array. When one current electrode is placed on the surface a great horizontal distance, "at infinity," from a borehole, two of the $r_n$ terms of equation (2) become very small, so that, by convention $$\rho a = \frac{2\pi}{[1/r_1 - 1/r_2]} \frac{V}{I} \quad (3)$$

Such an arrangement of electrodes will be referred to as the pole-dipole array. In the pole-pole array, both one current electrode and one potential electrode are placed on the surface a great horizontal distance away ("at infinity"). Equation (2) then reduces, by convention to:

$$\rho a = \frac{2\pi}{r_1} \frac{V}{I} \quad (4)$$

When the earth is inhomogeneous and/or anisotropic, both apparent resistivity and induced polarization can be calculated along surface, borehole, or subsurface profiles when the resistivity and/or induced polarization distributions in the subsurface are assumed. This mathematical procedure is referred to as forward modeling; i.e., a prediction of apparent resistivity and/or induced polarization along surface, borehole, or subsurface profiles or surfaces is made from an assumed model of the earth.

As an example, equation (4) pertains to the pole-pole array on the surface of a homogeneous half-space. When the electrodes are below the surface of the earth, images of each current electrode occur above the surface of the earth. Then equation (4) exhibits the form:

$$\rho a = 2\pi \frac{V}{I} \left[ \frac{1}{r_1} - \frac{1}{r_i} \right] \quad (5)$$

where $r_i$ is the distance from the potential pole to the image of the current pole.

Inverse solutions are known whereby a least-squares fit is performed between measured and computed values of $\rho_a$ versus pertinent electrode spacings. A Weighted least-squares sum may be written:

$$S = \sum_{i=1}^{m} \left[ (\rho a(x_i))^{OBS} - \rho a(x_i,p)^{CAL} \right]^2 / \text{Var } \rho a(x_i)^{OBS}. \quad (6)$$

where $(x_i)\rho_a^{OBS}$ is the observed or measured value of apparent resistivity at location $x_i$ and $(x_i,p)\rho_a^{CAL}$ is the calculated apparent resistivity at location $x_i$ due to the theoretical model defined by the parameters $\underline{p}$. The n-dimensional parameter vector $\underline{p}$ is comprised of such quantities as the resistivities of the overburden, host rock, and the several inhomogeneities inherent in the earth; it may also include depths, dips, and orientations of interfaces, depth extents and strikes of inhomogeneities, strike lengths, and thicknesses of inhomogeneities, and such other geometrical and physical property factors as may be inherent in the model selected to represent the real earth. The n-dimensional parameter vector $\underline{p}$ is varied through numerical automation until equation (6) is minimized. The quantity Var $(x_i)\rho_a^{OBS}$ is the statistical variance of the observed data points.

Induced polarization parameters include:

$$\text{PFE (percent frequency effect)} = \frac{\rho_{LF} - \rho_{HF}}{\rho_{LF}} \times 100, \quad (7)$$

where $\rho_{LF}$ is the apparent resistivity measured at some low frequency, e.g., 0.1 Hz, $\rho_{HF}$ is the apparent resistivity measured at some high frequency, e.g., 1Hz; and $\phi$ = phase of measured voltage with respect to impressed current; (8)

both of which are measured in the frequency domain, and

M (chargeability) = MV·s/V, measured in the time domain, (9)

where MV·s is an area under a received voltage decay curve after the transmitting current is cut off, while V is the voltage observed at the receiver (potential electrodes) when the transmitting current (current electrodes) is on.

SUMMARY OF THE INVENTION

The present invention provides a means for obtaining a multiplicity of electrical resistivity and/or induced polarization data using a multiplicity of different electrode locations and arrays which can be inverted to obtain information about the resistivity distribution within a subsurface region. The apparent resistivity and/or induced polarization values of cells within this subsurface region may be determined to construct a resistivity and/or induced polarization model of much greater resolution than has heretofore been available. For convenience, the electrical and/or induced polarization data itself is called "redundant data" in this disclosure and the appended claims, although the data itself is not in every sense literally redundant.

The term "redundant data," as used in this disclosure, implies two distinct characteristics. First, the procedures of this invention utilize multiple resistivity arrays to obtain data pertinent to a single subsurface region of interest. The data from each of these arrays provides information about the same geologic structure, and in that sense may be regarded as redundant. Secondly, "redundant," as used in this disclosure, implies "overdetermined."

The term "overdetermined" is explained in the textbook "Applied Analysis," Cornelius Lanczos, Prentice-Hall Mathematics Series (U.S. 1964) at Section 25 of Chapter II as follows:

"The ingenious method of least squares makes it possible to adjust an arbitrarily overdetermined and incompatible set of equations. In fact, we make an asset out of a liability and try to overdetermine a set of equations as much a possible by making an arbitrary number of surplus observations beyond the minimum number demanded by the number of unknowns.

The procedures of this invention collect at least as many, typically more, data points than earth parameters to be determined. Data from a single array or combined data from multiple arrays can be used to provide redundancy.

Central to the practice of the present invention is the generation of as large a quantity of redundant data as is practicable under the circumstances. To accomplish this objective, a multiplicity of electrode sites is established. This invention is described within this disclosure as though an electrode is physically located at each such site, although it is contemplated that in some embodiments of the invention, electrodes may be physically moved from time-to-time from site to site. In any event, current electrodes are positioned at two of the electrode sites, and a current is impressed between them. In some applications, one of these electrodes may be located sufficiently distant from the other electrodes to be regarded as infinitely remote. Similarly, one of the potential electrodes may be positioned at an infinitely remote location.

This disclosure will follow a conventional practice of identifying current electrodes as A and B, respectively, and will further indicate the location of those electrodes through subscripts: B indicating borehole, S indicating surface, D indicating a subsurface platform, and $\infty$ indicating remote. Potential electrodes are designated M and N with similar subscripts designating their location in the borehole, on a subsurface platform, or at the surface, respectively. Additionally, individual site locations may be designated by reference to an imaginary horizontal grid imposed on the earth's surface and an imaginary vertical scale indicating various vertical positions (elevations) within a borehole or shaft. Each such location may be assigned a unique identification (address). Such addresses may be indicated by additional subscript or superscript notation as required by context. For example, a specific current electrode site located in a specific borehole at a specific depth may be designated $A_{B30,n}$. In context, this notation is often simplified in practice by deleting obvious terms.

Circuit means and switching means interconnect the electrodes and are operated to select various pairs of sites between which to measure the impressed polarization or voltage drop resulting from the impressed current maintained between the current electrodes. By rapid switching, it is feasible to measure the potential difference and phase difference between any two electrode sites while impressing a current between any other two electrode sites, thereby accumulating a vast amount of redundant data reflecting the apparent resistivity and induced polarizability of the earth between all possible combinations of current and potential electrodes.

The redundant data accumulated in this fashion is somewhat analogous to data accumulated by CAT scan techniques and can be processed by mathematical approaches analogous to those utilized in interpreting CAT scan data. Both integral-equation and finite-element solutions can be applied to data to model two-dimensional resistivity structures. Three-dimensional models may also be constructed following similar mathematical techniques.

An elaborate form of the invention may be practical in circumstances which permit placement of point electrodes in a plurality of locations on the surface of the earth, in two or more vertical shafts or boreholes and on one or more subsurface platforms, such as a mine shaft or cavity floor. The electrodes can then be electrically associated in a variety of arrays, including, among others: pole-pole, pole-dipole, and dipole-dipole arrays operated in borehole-to-surface, surface-to-borehole, drift-to-borehole, borehole-to-drift, and cross borehole methods. Less elaborate forms of the invention are available with more limited electrode placement options.

BRIEF DESCRIPTION OF THE DRAWINGS

In the drawings, which illustrate what is presently regarded as the best mode for carrying out the invention.

DESCRIPTION OF THE ILLUSTRATED EMBODIMENTS

Figure 1:
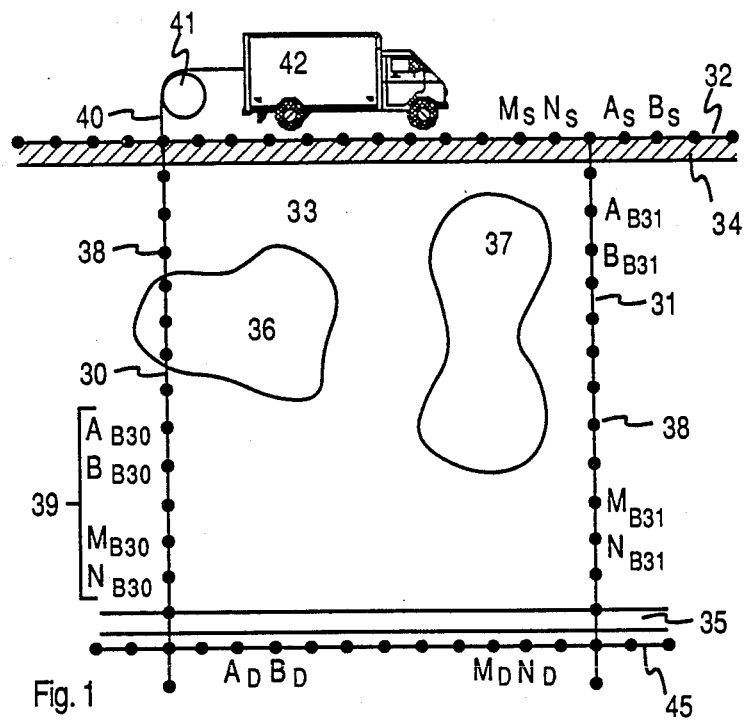
FIG. 1 is a schematic representation of a generalized disposition of current and potential point electrodes relative to typical geophysical features.

As illustrated by FIG. 1, boreholes 30 and 31 extend approximately vertically from the surface of the earth 32, into a subsurface region designated generally as 33. Within the region 33 there may be an overburden 34, a layer 35, inhomogeneities 36 and 37 and such other geologic entities as may occur in any part of the earth's crust. The borehole 30 is shown passing through a zone 36 of relatively high or low resistivity. A second such zone 37 of high or low resistivity is shown within the region 33, but remote from the borehole 30. An electrode string 39 (which could be a sonde) with electrodes ($A_{B30}$ $B_{B30}$ $M_{B30}$ $N_{B30}$) occupying a multiplicity of electrode sites 38 is suspended within the borehole 30 by means of cabling 40 which is in operable association with an above-ground winch 41 and a recording truck 42 which includes data acquisition and processing facilities. If a single electrode or a sonde containing only a few electrodes is used, rather than a string of electrodes, the single electrode or the sonde may be moved either continuously or discontinuously up or down the borehole 30. Likewise, a single electrode, a sonde, or a string of electrodes may be lowered or raised in borehole 31 by means of suitable well-head equipment. FIGS. 2 through 6 illustrate less elaborate electrode arrangements.

In the pole-pole array, one of the multiplicity of electrode sites 38 in borehole 30 is occupied by the current electrode $A_{B30}$, and one of the multiplicity of electrode sites 38 in borehole 31 is occupied by the potential electrode $M_{B3l}$. Another of the multiplicity of electrode sites 38 on the surface 32 is occupied by the potential electrode $M_s$, and one of the multiplicity of electrode sites 38 on the subsurface platform 45 is occupied by the potential electrode $M_D$. The return current electrode $B_\infty$ is on the surface at a remote location while the second potential electrode $N_\infty$ is also at the surface and at electrical "infinity." For each vertical position of $A_{B30}$ amongst the multiplicity of electrode sites 38 in borehole 30, potentials are measured at all other electrode sites 38 in borehole 30, at all electrode sites 38 on the surface 32, at all electrode sites 38 in borehole 31, and at all electrode sites 38 on the subsurface platform 45. These measurements of potential are achieved through rapid switching. Following these measurements, the current electrode $A_{B30}$ is moved to an adjacent location and all remaining electrode sites 38 in borehole 30, all electrode sites 38 on the surface 32, all electrode sites 38 in the borehole 31, and all electrode sites 38 in the subsurface platform 45 are again utilized to measure potential. The process of relocating electrode AB30 and measuring potentials at all other electrode sites is repeated a sufficient number of times to meet the criterion of an over-determined or even-determined system of equations necessary for the inversion schemes described in more detail hereinafter. In the general case, data collection will also involve use of current electrodes $A_s$, $A_{B3l}$, and $A_D$ at each site 38 on the surface 32, in borehole 31, and on the subsurface platform 45, respectively.

Figure 2:
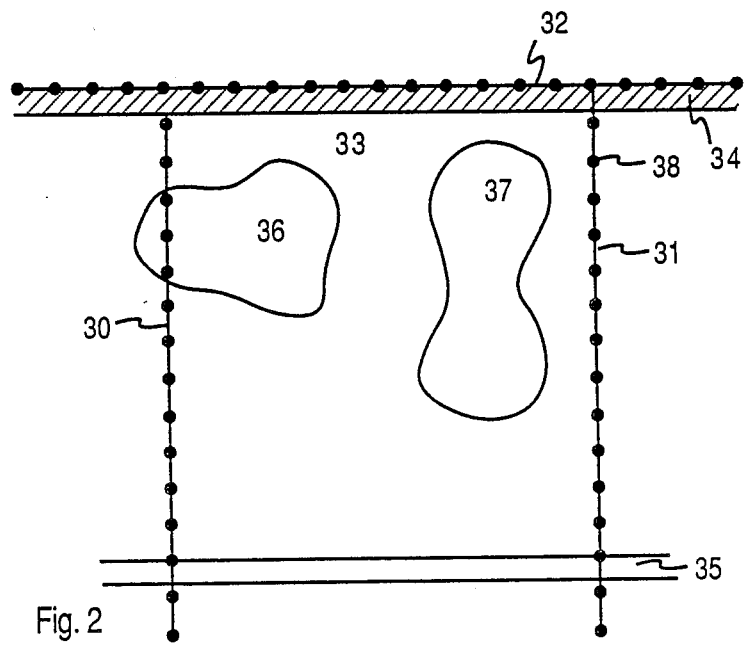
FIGS. 2 through 6 are schematic representations of less elaborate dispositions of electrodes relative to the geophysical features in FIG. 1.
Figure 3:
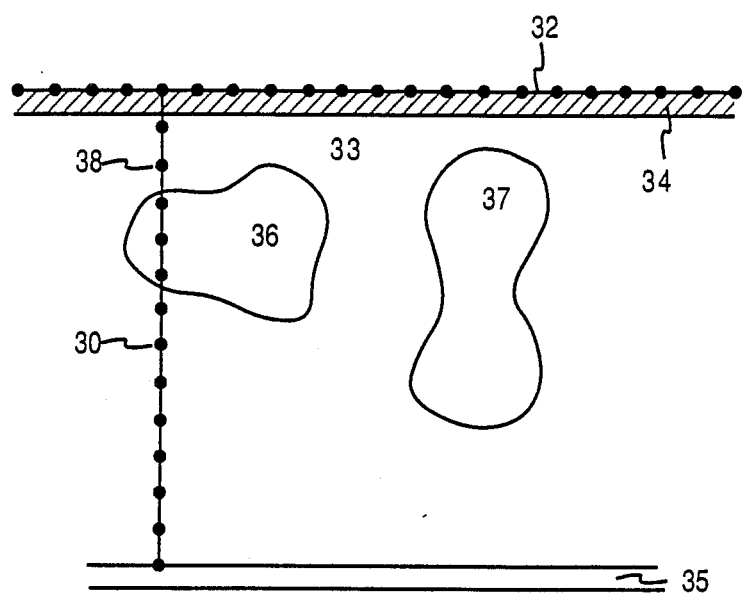
Figure 4:
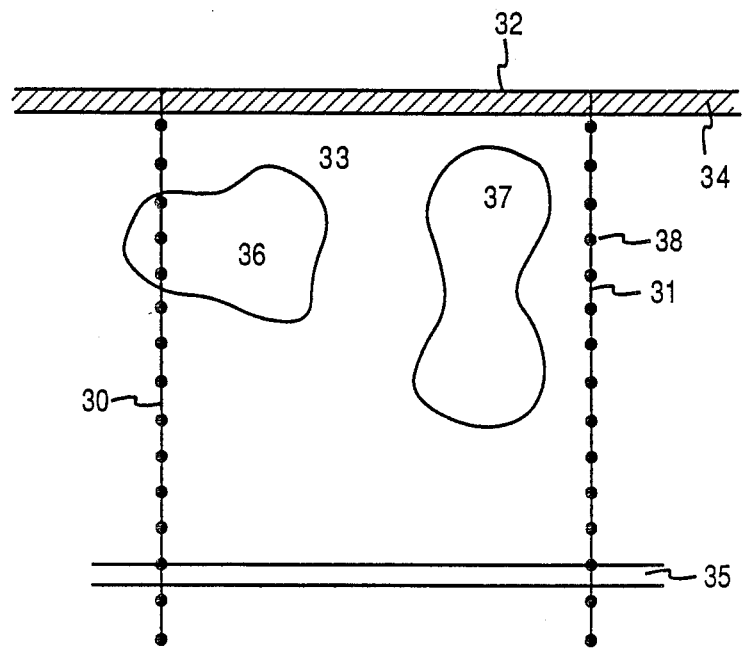
Figure 5:
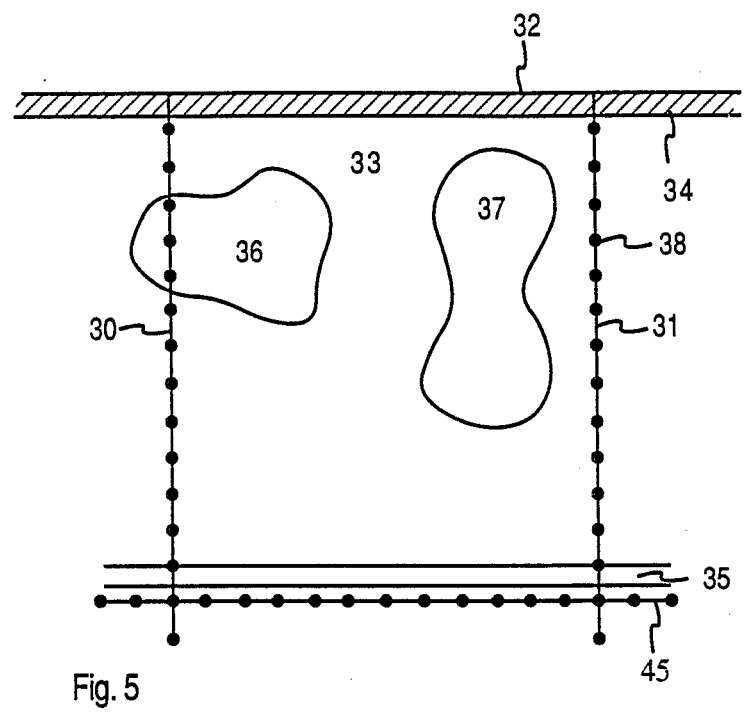
Figure 6:
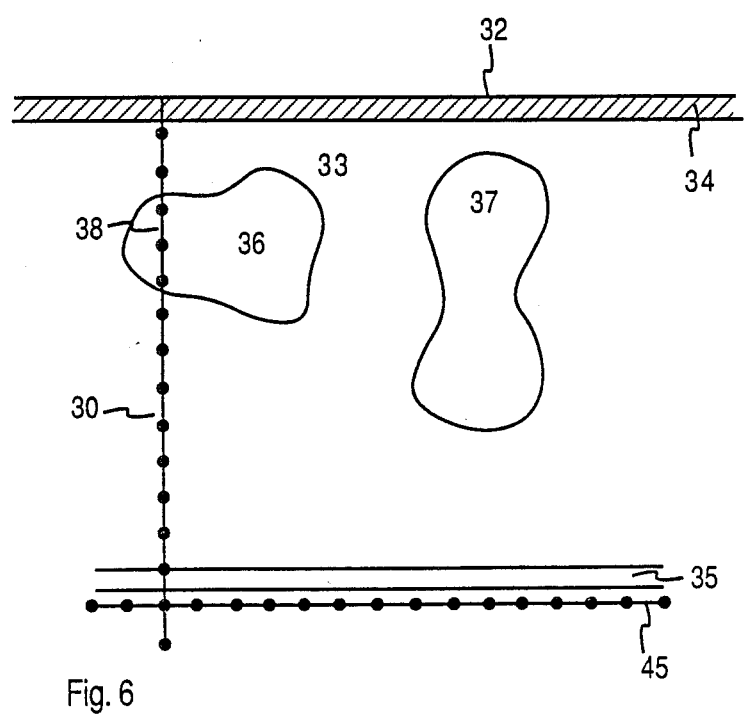
Figure 7:
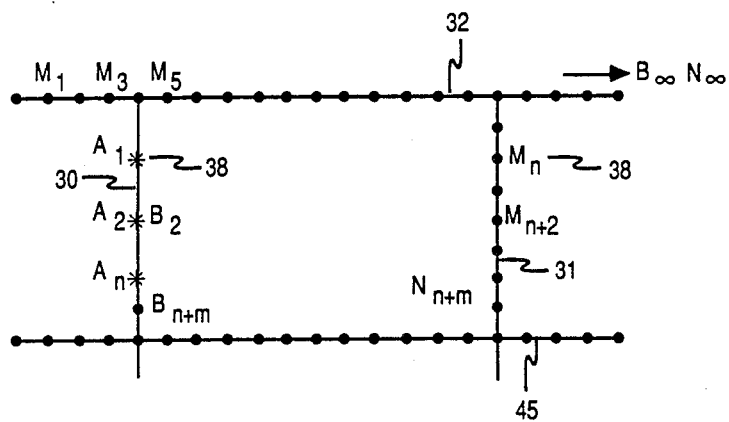
FIG. 7 is an illustration of the electrode dispositions possible with the generalized borehole, surface and subsurface platform of FIG. 1 for a pole-pole array ($A_n M_n B_\infty N_{28}$) a pole-dipole array ($A_n M_n N_{n+m} B_\infty$) and a dipole-dipole array ($A_n B_{n+m} M_n N_{n+m}$)
Figure 8:
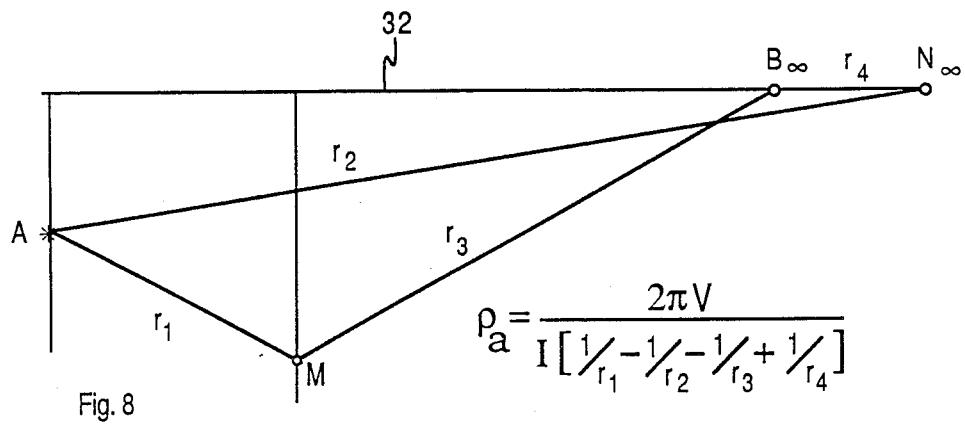
FIG. 8 is a diagram illustrating the distances $r_n$ used in the of apparent resistivity by equation (2)
Figure 9:
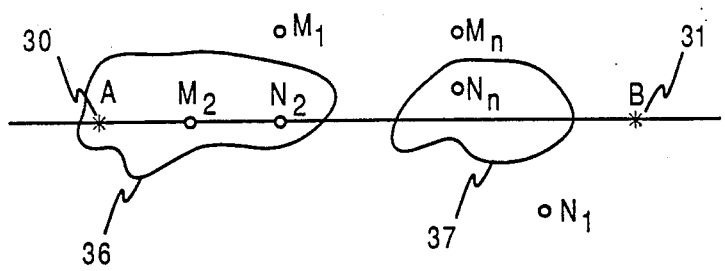
FIG. 9 is a plan view illustrating dispositions of potential electrodes on the surface of the earth as poles ($M_n$) or dipoles ($M_n N_n$)
Figure 10:
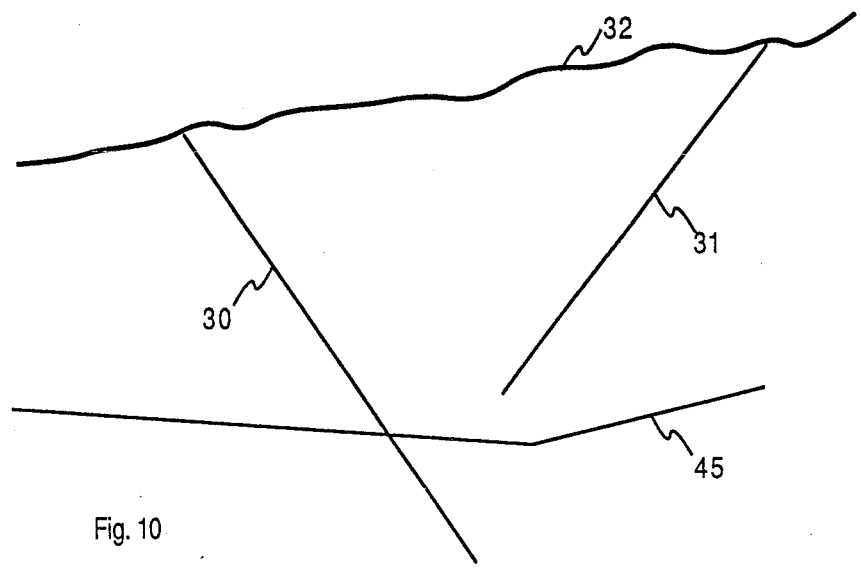
FIG. 10 illustrates a possible orientation of the earth's surface, the subsurface platform and the boreholes shown in FIG. 1.

Referring to FIG. 2, if the subsurface platform 45 is not available for the provision of either current or potential electrode sites 38, the same general sequence of events described in connection with FIG. 1 can be followed, but with all electrode sites 38 on the subsurface platform 45 of FIG. 1 deleted. FIG. 3 illustrates a circumstance in which electrode sites 38 in borehole 31 and on the subsurface platform 45 are deleted, but the same general sequence of events described in connection with FIG. 1 can nevertheless be followed. Similarly, FIG. 4 illustrates a pattern of electrode sites 38 provided by boreholes 30 and 31 only. Again, the same general sequence of events can be followed. FIG. 5 illustrates the case where no surface 32 electrode sites 38 are available but electrode sites 38 in boreholes 30 and 31 and on the subsurface platform 45 are available. FIG. 6 illustrates the case where only a borehole 30 and a subsurface platform 45 have electrode sites 38 available. Each electrode site 38 may be occupied in sequence as appropriate by either a current electrode or a potential electrode.

A pole-dipole array positions the current electrode $A_{B30}$ to occupy one of the multiplicity of electrode sites 38 in borehole 30 and positions the return current electrode $B_\infty$ at "infinity" on the surface. Then, two of the multiplicity of electrode sites 38 in borehole 31 are occupied by the potential electrodes $M_{B3l}$ and $N_{B3l}$. A potential difference is thereby measured. Two of the multiplicity of electrode sites 38 on the surface 32 are occupied by the potential electrodes $M_s$ and $N_s$, and two of the multiplicity of electrode sites 38 on the subsurface platform 45 are occupied by the potential electrodes $M_D$ and $N_D$. Again, potential differences are measured. For each position of $A_{B30}$ amongst the multiplicity of electrode sites 38 in borehole 30, potential differences are measured at all available pairs of electrode sites 38 in borehole 30 ($M_{B30}N_{B30}$), at all pairs of electrode sites 38 on the surface 32 ($M_sN_s$), and at all pairs of electrode sites 38 on the subsurface platform 45 ($M_DN_D$), as in the case of the pole-pole array. Rapid switching permits all of these measurements to be made within practical time constraints. The process is repeated a sufficient number of times to meet the criterion of an over-determined or an even-determined system of equations necessary for the inversion schemes described hereinafter. In the general case, data collection in the pole-dipole array will involve use of current electrodes $A_s$, $A_{B3l}$ and $A_D$ on the surface 32, in borehole 31, and on the subsurface platform 45, respectively, plus all potential electrode pairs $M_{B30}N_{B30}$, $M_sN_s$, $M_{B3l}N_{B3l}$, and $M_DN_D$. The roles of boreholes 30 and 31 are interchangeable for this process, and the electrode pairs $M_{B30}N_{B30}$, $M_sN_s$, $M_{B3l}N_{B3l}$, and $M_DN_D$ do not necessarily occupy adjacent electrode sites 38.

If the subsurface platform 45 is not available for use as either current or potential difference sites 38, as illustrated by FIG. 2, then the same general sequence of events will be followed but with all electrode sites 38 on the subsurface platform 45 of FIG. 1 deleted. Each of FIGS. 3, 4, 5 and 6 illustrate circumstances in which one or more of the surface 32, one of the boreholes 30, 31 or the subsurface platform 45 are unavailable for the disposition of electrodes. In each instance the general sequence of events described in connection with FIG. 1 may be followed to obtain redundant data. In all events, it is usually desired to dispose in turn both a current electrode and one of a pair of potential electrodes at each of the available electrode sites 38.

Referring again to FIG. 1, a dipole-dipole array array positions current electrodes $A_{B30}B_{B30}$ in two of the multiplicity of electrode sites 38 in borehole 30 and positions potential electrodes $M_{B31}N_{B31}$ in two of the multiplicity of electrode sites 38 in borehole 31. Two of the multiplicity of electrode sites 38 on the surface 32 are occupied by the potential electrodes $M_sN_s$ and two of the multiplicity of electrode sites 38 on the subsurface platform 45 are occupied by the potential electrodes $M_DN_D$. For each position of the $A_{B30}B_{B30}$ pair amongst the multiplicity of electrode sites 38 in borehole 30, potential differences may be measured at all other pairs of electrode sites 38 in borehole 30, at all pairs of electrode sites 38 on the surface 32, at all pairs of electrode sites 38 in borehole 31, and at all pairs of electrode sites 38 on the subsurface 45. The current electrode pair $A_{B30}B_{B30}$ may then be moved to an adjacent location, and the data collection process repeated as previously described in connection with the pole-pole and pole-dipole arrays. In the ideal general case, current electrode pairs ($A_sB_s$, $A_{B31}B_{B31}$, $A_DB_D$) will also be positioned at all available sites on the surface 32, in borehole 31, and on the subsurface platform 45, respectively.

FIGS. 2 through 6 illustrate less elaborate electrode disposition availabilities due to the unavailability of electrode sites 38 at one or more of the surface 32, boreholes 30, 31 or subsurface platform 45.

The electrode sites 38 in the dipole-dipole array may be spaced at any interval, such as 1 meter or 100 meters or more; the larger the interval, in general, the larger the zone of search. The speed with which the electrodes or electrode pairs may be cycled through the switching sequences described depends partially on switching circuitry but also upon the need to make a measurement over a sufficient period of time that electromagnetic coupling effects may be evaluated and removed.

Applying the method of this invention to standard logging techniques, a sonde or electrode may be moved through the boreholes 30 or 31 at a rate of approximately 10 meters per minute. If measurements are made every six seconds, the logging sonde or electrode moves approximately one meter vertically during this interval. As a practical matter, there is often a need to compromise between obtaining all possible measurements or the minimum number of measurements necessary to achieve over-determination or even-determination, taking into account the speed and economy required for a survey. The following examples illustrate certain practical approaches that are readily derived from the foregoing disclosure.

EXAMPLE I

Figure 11:
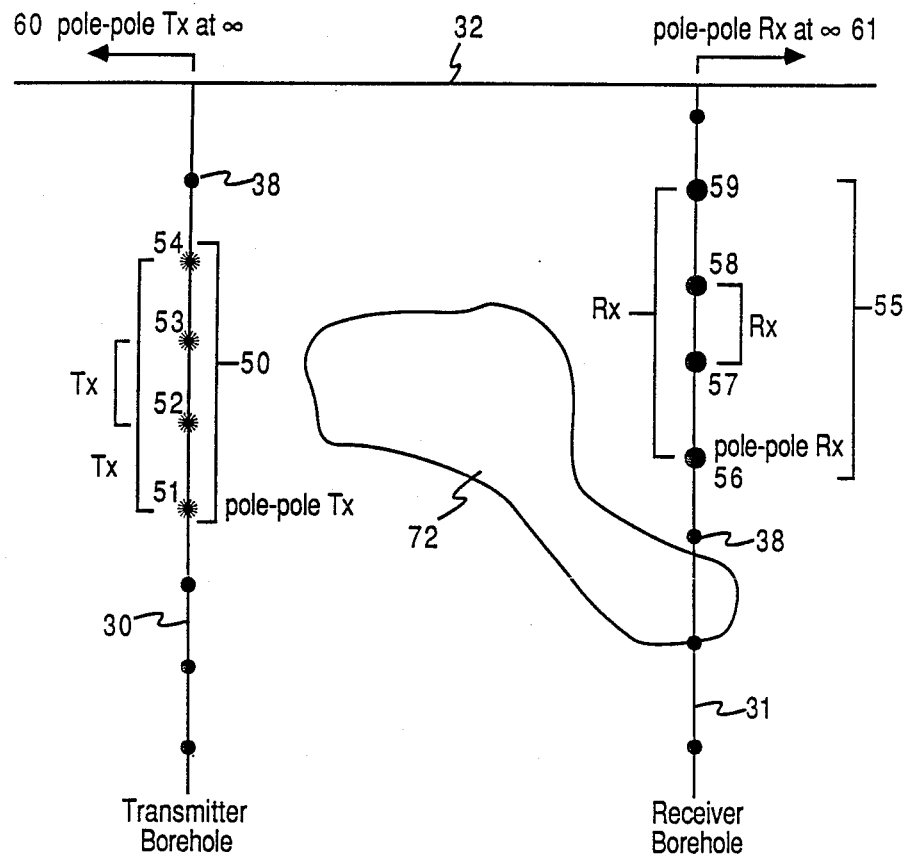
FIG. 11 is a diagram illustrating pole-pole, pole-dipole (short and long) and dipole-dipole (short and long) arrangements in a borehole-to-borehole configuration.

FIG. 11 illustrates one possible configuration of a string 50 of four energized transmitting electrodes, 51, 52, 53, 54, hand lowered into borehole 30 (FIG. 1) and a string 55 of four potential electrodes, 56, 57, 58, 59, lowered by winch into borehole 31. Other available electrode locations 38 are also shown. A transmitting (current) electrode 60 and a potential electrode 61 are disposed at the surface 32 as shown.

Figure 12:
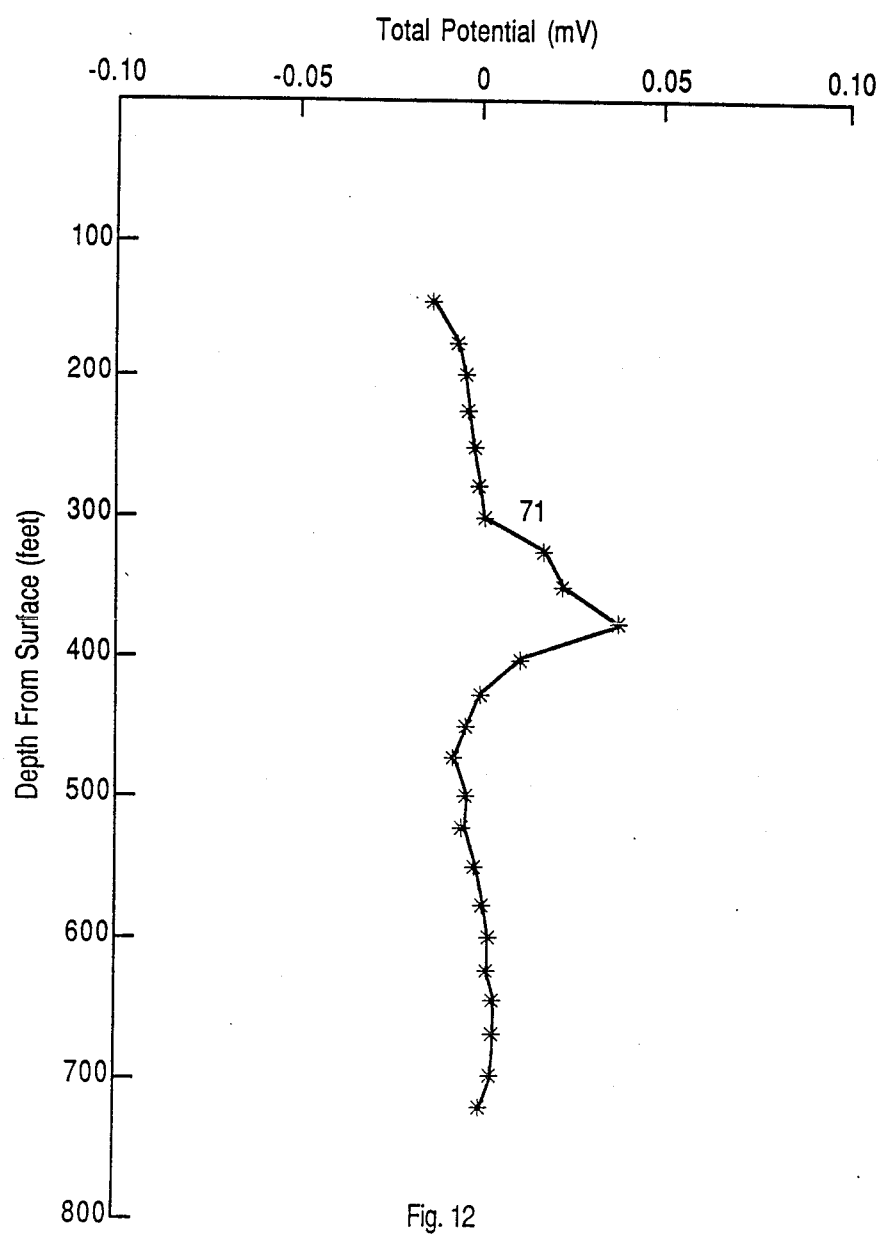
FIG. 12 illustrates typical field data obtained with a pole-dipole cross-borehole method.

The pole-pole array is accommodated by energizing electrodes 51 and 60 and measuring potential via electrodes 56 and 61. A pole-dipole array is accommodated by energizing electrodes 51 and 60 and measuring potential differences via electrodes 57 and 58 (short dipole) and electrodes 56 and 59 (long dipole). The dipole-dipole array is accommodated by energizing electrodes 52 and 53 (short dipole) or 51 and 54 (long dipole) and measuring potential differences via electrodes 57 and 58 (short dipole) or 56 and 59 (long dipole). Once all such measurements are made, then the potential electrodes 56, 57, 58, and 59 are moved an arbitrary distance down the borehole 31 and all measurements are repeated. These four potential electrodes could occupy 10 to 100 or more sites 38 for each location of the four transmitting electrodes 51, 52, 53, 54. Then the four transmitting electrodes are moved to adjacent sites 38 and the process of measuring and moving the potential electrodes is repeated as many times as is necessary to gather the desired redundant data. Typical field data taken with the pole-dipole array in a cross-borehole configuration, such as shown by FIG. 11, is illustrated by FIG. 12. Total potential in millivolts is recorded down borehole 31 and a profile 71 indicates an anomaly 72 at depths between 300 and 400 feet. FIG. 12 illustrates a typical circumstance wherein the borehole 30 containing the transmitting pole is 500 feet laterally removed from borehole 31; the transmitting pole 51 is 450 feet down borehole 30. The potential dipole 57, 58 is 25 feet in length and is moved down borehole 31 in increments of 25 feet.

EXAMPLE II

Figure 13A:
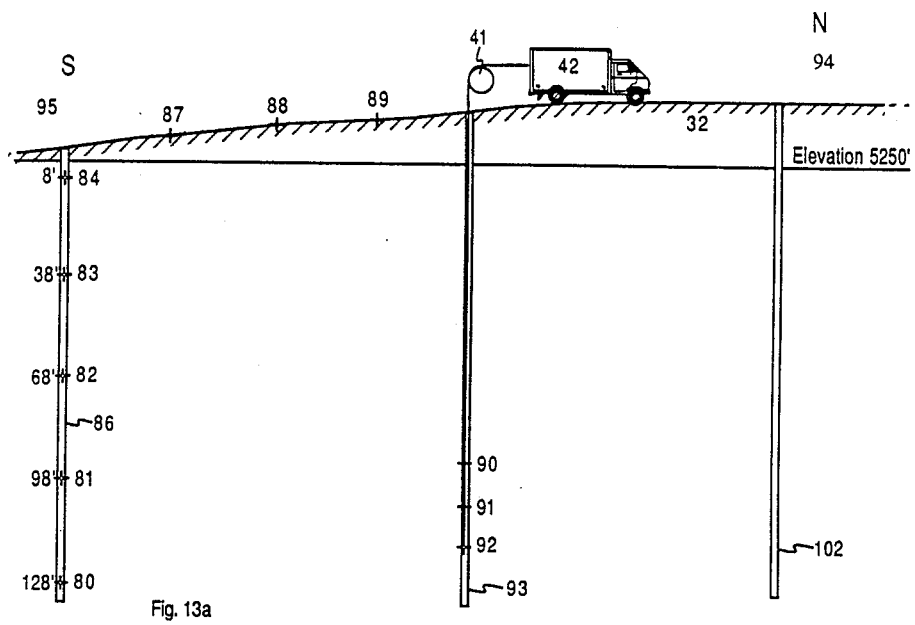
FIGS. 13a and 13b illustrate a typical sequence of combined borehole-to-borehole and surface-to-borehole arrays in a preliminary field test.
Figure 13B:
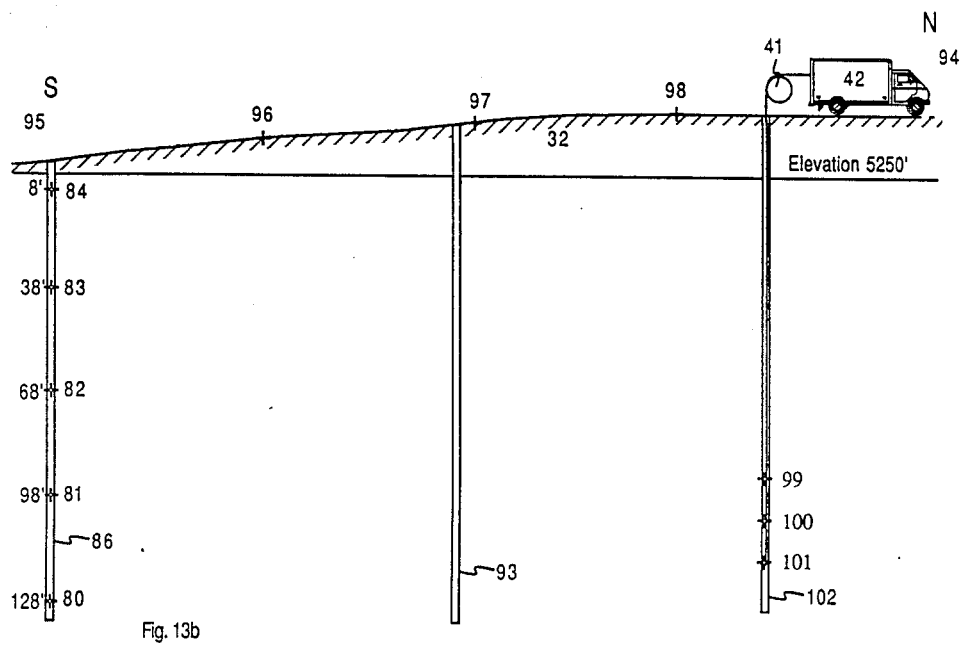

FIGS. 13a and 13b illustrate a preliminary field survey. A string of transmitting electrodes 80, 81, 82, 83 and 84 is lowered by hand down a borehole 86. Additional transmitting electrodes 87, 88, 89 are positioned on the surface 32. Three potential electrodes 90, 91 and 92 are lowered by winch in borehole 93. Another potential electrode 94 is located a long distance away on the surface, as is current electrode 95. The three potential electrodes 90, 91 and 92 are moved in increments of 12.5 feet to occupy eight different locations in borehole 93. At each such location, potential differences are measured while each of transmitting electrodes, 80, 81, 82, 83, 84, 87, 88 and 89 is energized in turn. The remote electrodes 94, 95 are involved in each measurement.

This whole process is repeated for current electrodes 80, 81, 82, 83, 84, 96, 97, 98 on the surface 32, and potential electrodes 99, 100, and 101 in borehole 102 (see FIG. 13b).

EXAMPLE III

Figure 14:
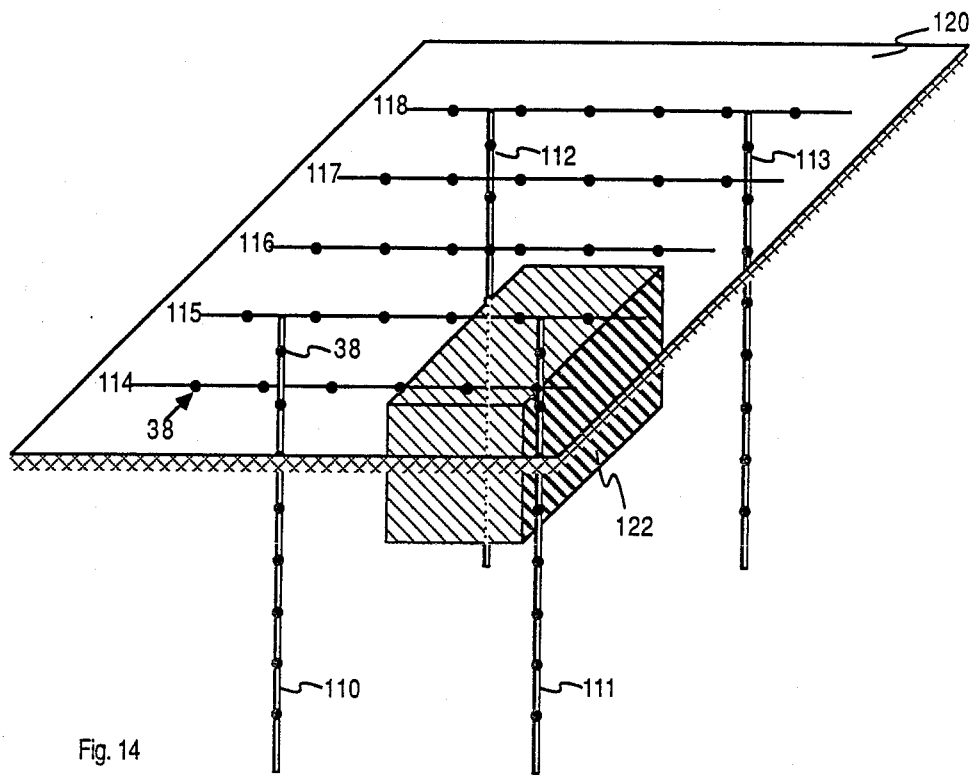
FIG. 14 is an isometric view of a generalized electrode disposition for borehole-to-borehole, borehole-to-surface, and surface-to-borehole arrays.

Referring to FIG. 14, for some investigations, it will be desirable to use one borehole 110 as the location for one or more transmitting electrode sites 38 and to measure potentials or potential differences in several other boreholes 111, 112 and 113 and on several traverses 114, 115, 116, 117, 118 on a horizontal grid plane 120 to determine the depth, dip, depth extent, strike, strike length, length, width, location, conductivity and induced polarization of one or more geologic bodies 122. The pole-pole, pole-dipole, and dipole-dipole arrays may be used singly or in consort for this purpose. The grid plane 120 may be above, below, or intersecting the geologic body 122, but typically approximates the surface of the earth.

When any current electrode $A_B$ is located at a site 38 that is positioned within the target body 122, the target body 122 is directly energized. In that event, the measurements of potential or potential differences at the surface and subsurface sites 38 may be processed by conventional mise-a-la-masse techniques.

Figure 15:
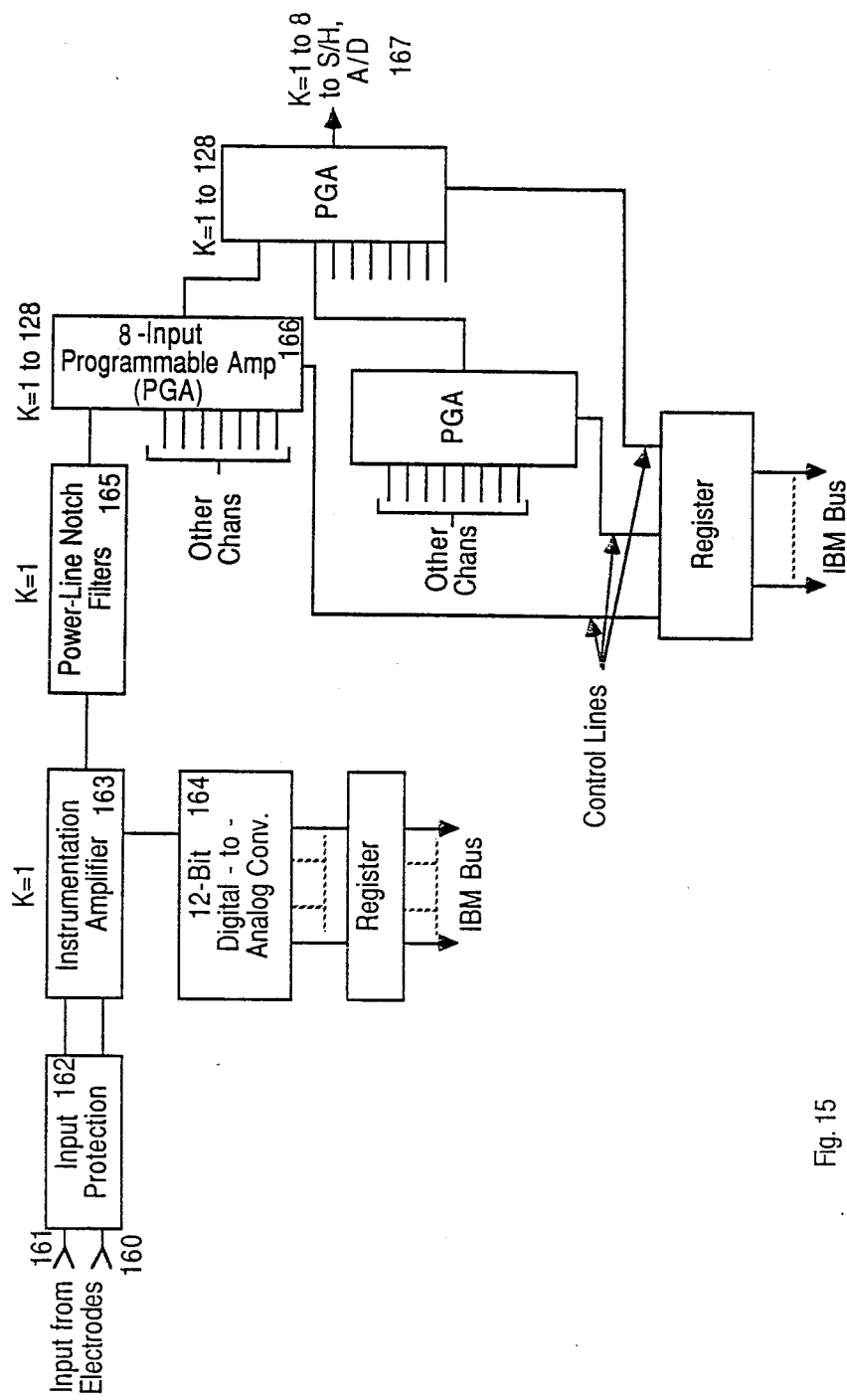
FIG. 15 is a block diagram illustrative of the circuitry employed to effect of potential.
Figure 16:
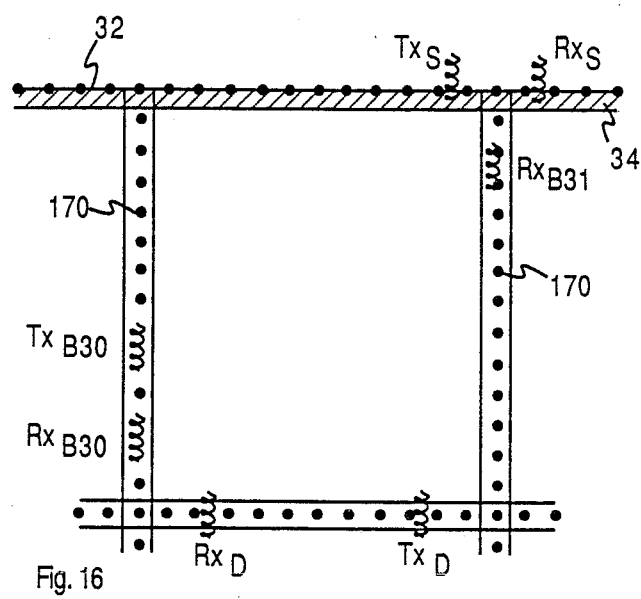
FIGS. 16 through 21 respectively, correspond to FIGS. 1 through 6, substituting magnetic dipoles for electric dipoles.
Figure 17:
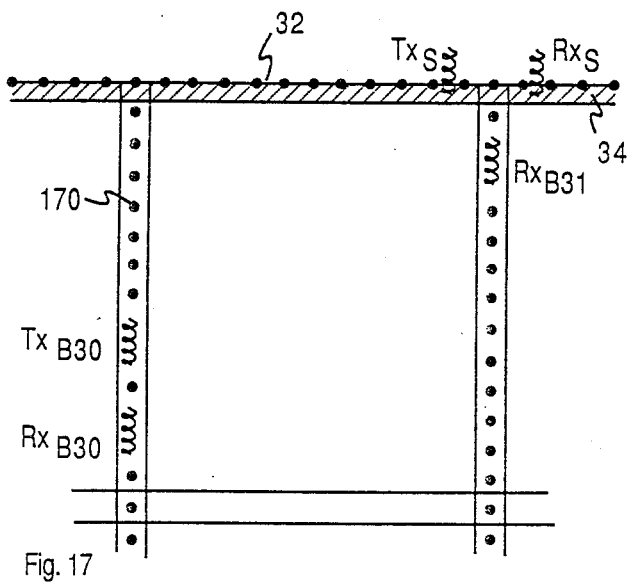
Figure 18:
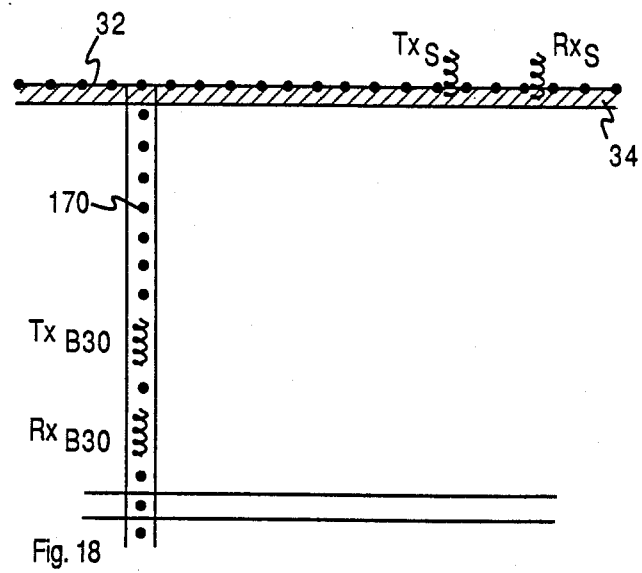
Figure 19:
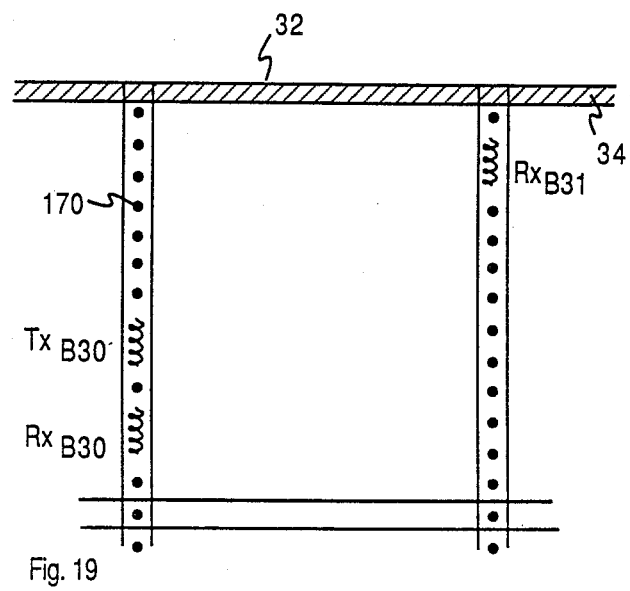
Figure 20:
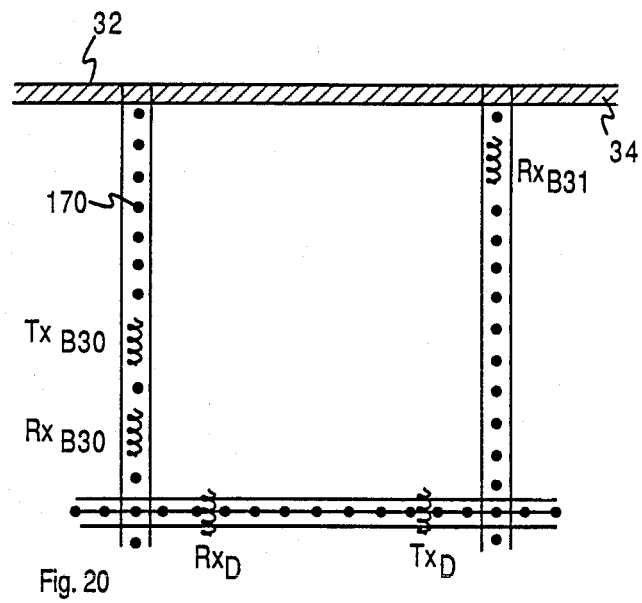
Figure 21:
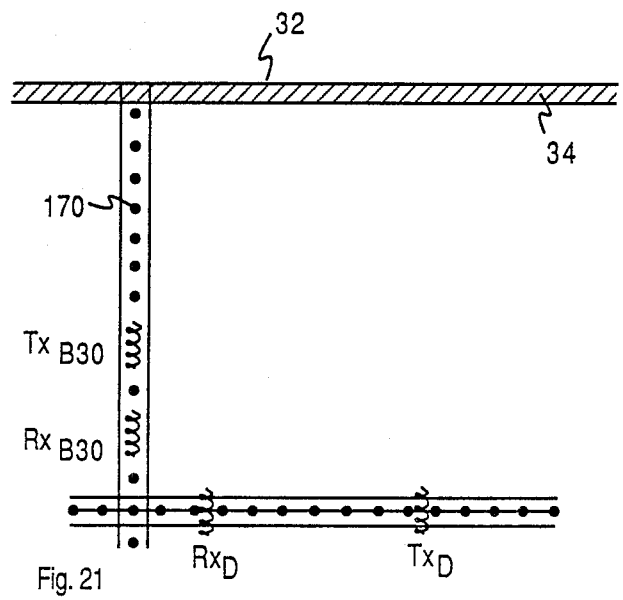

FIG. 15 illustrates a multi-channel receiver capable of taking a number of potential measurements simultaneously. The measurements may be made separately one at a time. It is also possible to make several such measurements simultaneously. Input protection for the input signals from the electrodes at inputs 160, 161 is provided by conventional circuitry 162. Such circuitry may include series resistors, clamped diodes, and a shorting reed-relay to positively prevent accidental transmitter connections from damaging the input stage. A high-impedance input instrumentation amplifier 163 is utilized to provide isolation and common-mode signal voltage rejection. As presently envisioned, the electrode self-potential and very low frequency telluric voltages are cancelled with a 12-bit digital-to-analog converter 164 which shifts the instrumentation amplifier's output. Notch-filters 165 tuned to the power-line frequency and harmonics remove interference from this source.

Amplification is obtained with multiplexing programmable-gain amplifiers 166. Analog portions of the receivers may be in a separate chassis to reduce noise. Analog output may be processed by an IBM AT (or compatible) computer with a 12-bit analog-to-digital converter 167 capable of 150,000 samples per second (e.g., Data Translation Co.).

With the apparatus illustrated by FIG. 15, much of the data accumulated may be processed in real time, and final data reduction can be achieved on site.

Each of the many transmitting electrode pairs will ordinarily have a unique impedance and will thus require a unique setting of the transmitter's voltage and current controls. Means are thus provided to equalize the voltage requirements for the electrodes and to adjust circuit parameters to maintain the current in the system within the transmitter's operating bounds. Programming the transmitter to account for the various transmitting electrode impedances encountered in an electrode array of the type illustrated by FIGS. 1 through 7, 10, 13, or 14 is important. One approach to achieving such programming is to measure the impedance of all surface electrode pairs prior to logging. The sonde is then lowered into a borehole and a continuous record made of transmitting electrode impedance. With these two pieces of information, it is possible to program the transmitter for logging uphole. Nevertheless, it is often helpful to stop sonde movement from time-to-time to permit manual adjustments for impedance matching.

Two approaches for modeling two-dimensional resistivity structures excited by three-dimensional sources are within specific contemplation: an integral-equation solution, and a finite-element solution, respectively. In either case, there results a model of the resistivity of individual cells within a region of the earth between and about the electrode sites. Both solutions are formulated in terms of secondary potentials.

According to the finite-element approach, a forward solution is computed by dividing the earth into a series of triangular elements (cells). The resistivity of the earth is considered constant within each of these elements and the electrical potential is assumed to vary linearly between the corners (nodes) of the elements. This method is particularly useful for modeling multiple inhomogeneities embedded in a layered earth. Sloping inhomogeneities are readily accommodated by the triangular elements.

The integral-equation approach computes a forward solution by dividing the earth into polygonal shaped regions with the resistivity assumed to be constant inside each of the regions. Layers of variable thickness can be approximated by using extremely long polygons. Each of the polygonal boundaries is made up of segments and the secondary electric field (caused by the presence of the anomalous bodies) is assumed to be due to a series of charges along the segment. These charges are assumed to be constant along each segment.

In both the integral-equation solution and the finite-element solution, the forward solution is inverted by using versions of the Marquardt-Levenburg method. According to this method, the algorithm starts with an initial guess and iteratively finds the model which provides the best weighted-least-squares fit to the data. With the finite-element solution, the resistivity in each of the triangular elements will be found. Thus, real earth situations are approximated by using a large number of elements with the position of elements fixed such that groups of elements of like resistivity collectively represent structures. According to the integral-equation approach, a relatively small number of polygons is used, but the shapes of the polygons are allowed to change in addition to inverting for resistivities.

The multi-array borehole resistivity and induced-polarization system so far described relies upon current and potential electrodes electrically connected to the ground at electrode sites 38. Very low frequency alternating current (0.03 Hz to 3 Hz) is used. It is assumed that any boreholes used are uncased or any point electrodes located in the boreholes are disposed in an uncased region. Reliable data collection through the use of such electrodes imposes this limitation on the system (unless perforated non-conducting casing is used). Other embodiments replace a pair of such electrodes (an electric dipole) by a magnetic dipole. This magnetic dipole may comprise a coil of wire of a fraction of a meter to several meters in length. Such magnetic dipoles may be used as transmitters (Tx) or as receivers (Rx). FIGS. 16 through 21 illustrate configurations comparable to those previously described in connection with FIGS. 1 through 6. Alternating current in the frequency range 10 Hz to 300,000 Hz may be used in the transmitters. Such a system is operable even in a cased borehole.

For each transmitter location (at any of sites 170), a receiver Rx may be placed at any other site 170. Eddy currents will be induced in any inhomogeneity (35, 36, or 37, FIG. 1) or in the host medium (33, FIG. 1) or the overburden (34, FIG. 1) by the transmitter Tx. Voltages will appear in the receivers Rx which may be interpreted in terms of the resistivities and/or induced polarization values of the overburden 34, the host rock 33, and of the several inhomogeneities 35, 36 and 37. They may also be interpreted in terms of the depth, dip, strikes, strike lengths, depth extents, and thicknesses of any or all of the inhomogeneities.

Measurements may be made in the frequency domain (sinusoidal current in the transmitter) or in the time domain (step or impulse current waveform in the transmitter).

Redundancy of data acquisition permits inversion, but the forward and inverse algorithms applied to the data will differ in specific detail from those appropriate for the electrode embodiments of the invention.

Figure 22A:
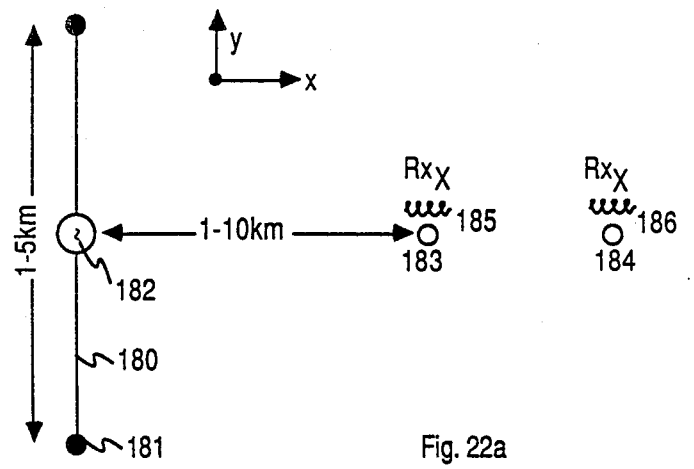
FIGS. 22a and 22b, 23a and 23b, 24a and 24b are respective pairs of plan and section views, respectively, illustrating alternative embodiments utilizing a surface electrode bipole (long wire) transmitter and various surface and downhole electric and magnetic receivers.
Figure 22B:
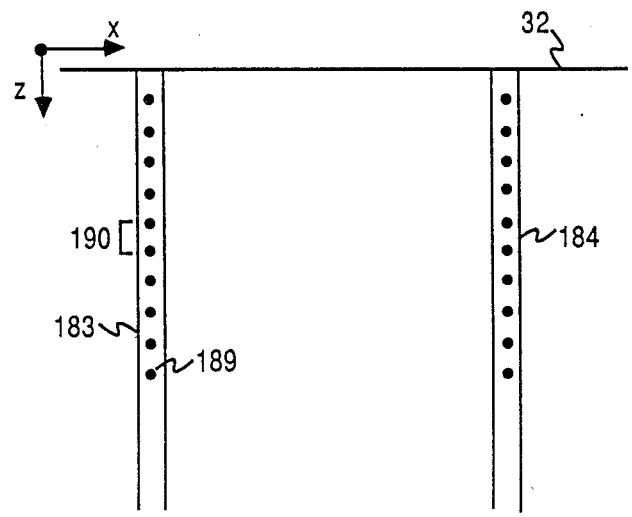

An alternate embodiment, the controlled-source audiomagnetotelluric (CSAMT) method, is illustrated in FIG. 22. An alternating electric bipole 180, grounded by electrodes 181 and energized by a generator 182 of alternating or pulsed current, serves as the source of an electromagnetic field. The alternating magnetic field (H) is measured at the surface of boreholes 183 or 184 by receivers (Rx) 185 and 186. Electric fields (E) are measured between electrode sites 189 down boreholes 183 and 184. The impedance represented by the ratio $E_z/H_x$ is computed from these results for each location of the receivers 190 downhole (X, Y and Z designate vector components of the fields, along conventional coordinate axes).

Figure 23A:
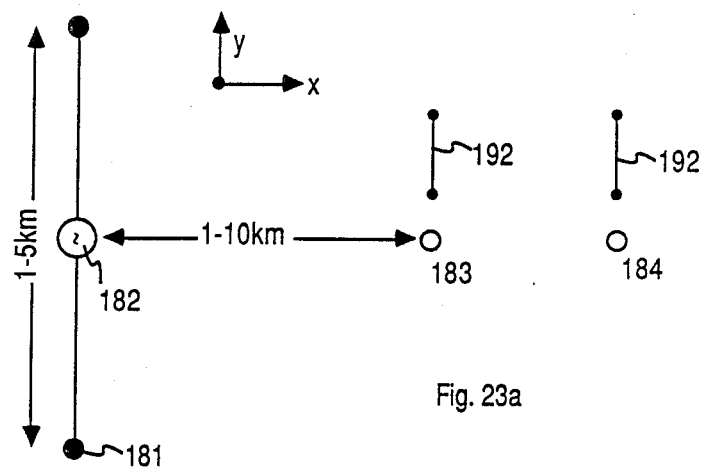
Figure 23B:
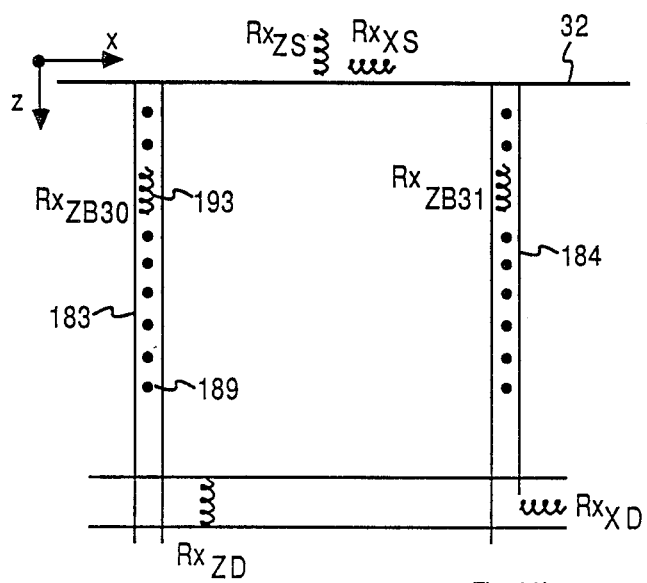
Figure 24A:
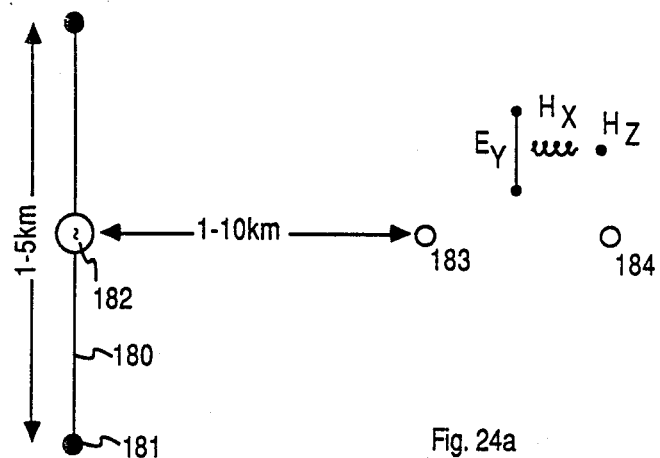
Figure 24B:
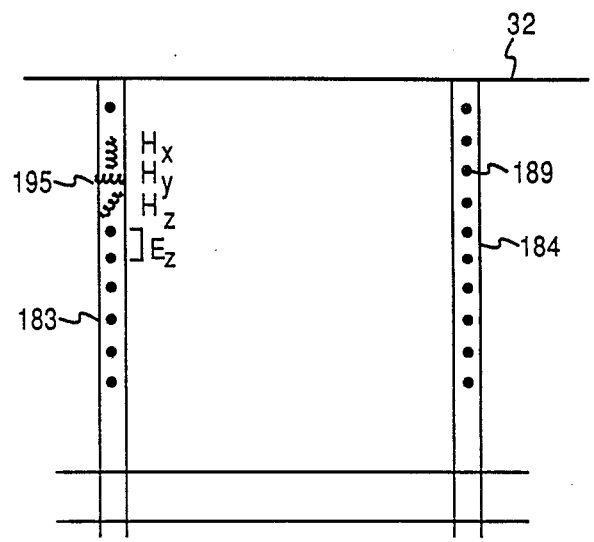

Alternatively, the electric field (E) may be measured at the surface by electrode pairs 192 as illustrated by FIG. 23a, and the magnetic field (H) may be measured downhole (193) as shown by FIG. 23b. The ratio $E_y/H_z$ may then be calculated. Moreover, the use of SQUID magnetometers 195 provides three orthogonal components of magnetic field which may be measured downhole or on surface as in FIG. 24. The downhole component ($E_z$) of the electric field may be measured between electrode sites 189 and 183 or 184. The ratios $E_z/H_x$, $E_z/H_y$, and $E_z/H_z$ may be calculated from these data.

In any event, the ratios $E_i/H_j$ or $H_i/E_j$ are acquired in sufficient redundancy to permit inversion.

If the source wire is brought into the vicinity of boreholes 183 and 184 and is oriented along strike, then the magnetometric resistivity (MMR) method may be accomplished as a subset. In this case, only the magnetic field components are measured.

Figure 25A:
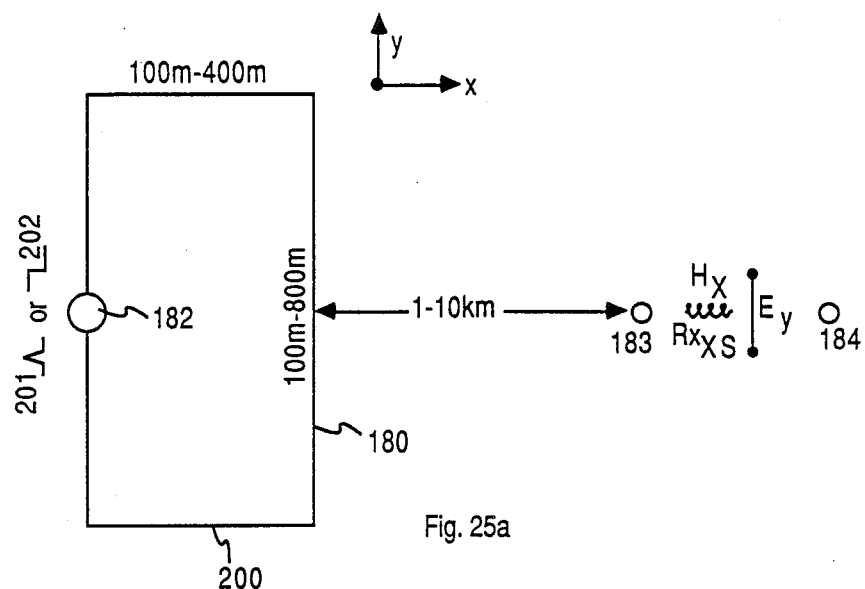
FIGS. 25a and 25b are plan and section views, respectively, illustrating an alternative method utilizing a long ungrounded loop transmitter and various surface and downhole electric and magnetic receivers.
Figure 25B:
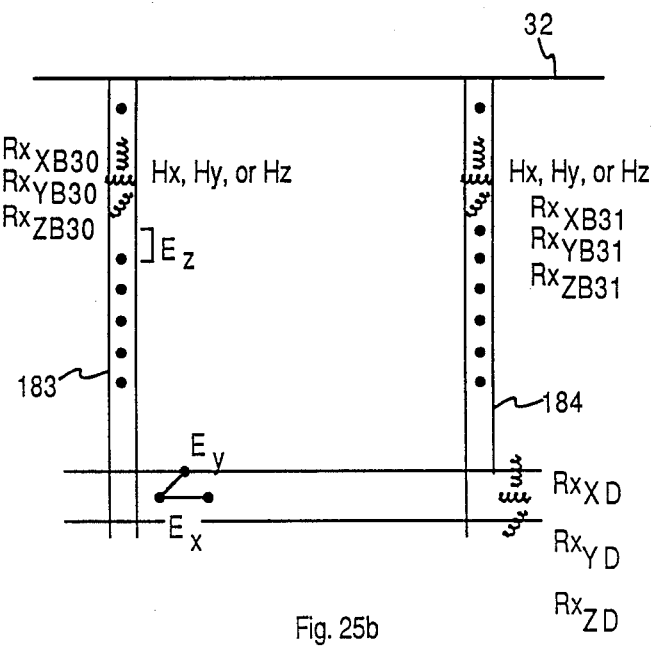

Referring to FIG. 25, the grounded wire source may be replaced by a large ungrounded loop 200 with a current excitation in the form of an impulse or a step function. This approach may be referred to as the large loop "Time-Domain Electromagnetic Method" (TEM). Under these circumstances, the individual quantities $E_i$, $H_j$ and/or their ratios $E_i/H_j$ or $E_j/H_i$ may be used in the inversion scheme. An impulse current 201 or a step current 202 waveform is applied by the generator 182 to the large loop 200. Electric and/or magnetic fields are measured at the surface and in boreholes.

Navy vertical electric dipole transmitters operating in the 15 to 30 Hz range are available as transmitters, and the same methodologies as described in connection with the CSAMT method may be achieved using these transmitters as sources. This approach is referred to as the Very Low Frequency (VLF) electromagnetics method.

In general, the procedures contemplated by this invention can be broadly regarded as a family of methods for conducting a geophysical survey (identifying regions of the earth of differing resistivities or induced polarization levels or the boundaries of such regions) comprising energizing a subsurface region of the earth with a transmitter (which may comprise a spaced pair of electrodes connected conductively to the earth or a magnetic transmitter (e.g., a dipole, bipole or wire loop) located to induce a field into the earth); establishing a multiplicity of receiver sites, which together with the transmitter define travel paths of electric or magnetic quantities through the subsurface region of interest; measuring the electric or magnetic quantities at said receiver sites, thereby to accumulate a mass of redundant data; and inverting the redundant data to determine the apparent resistivity values (or induced polarization values) of cells within that subsurface region. A resistivity (or induced polarization) model of the subsurface region can then be constructed.

Reference herein to details of the illustrated embodiments is not intended to limit the scope of the claims which themselves recite those details regarded as important for the practice of the invention.

What is claimed is:

1. A method for conducting a geophysical survey, comprising:
    establishing a multiplicity of sites, each said site being located on or beneath the surface of the earth, said sites being spaced to define travel paths for energy between respective pairs of said sites through a subsurface region at least one of said sites being beneath the surface of the earth;
    energizing said subsurface region by applying electric or electromagnetic energy at a said site;
    measuring electric or magnetic quantities at other of said sites, thereby to collect a quantity of overdetermined redundant data related to the resistivity of said subsurface region; and
    mathematically inverting said redundant data to determine the resistivity or induced polarization values of cells within said subsurface region.

2. A method according to claim 1 further including the step of determining boundaries of cells of differing resistivity or induced polarization values.

3. A method according to claim 1 wherein said subsurface region is energized by means of locating current electrodes at two of said sites and applying a current between said electrodes; and said quantities comprise voltages measured between potential electrodes located at pairs of other said sites.

4. A method according to claim 3 comprising:
    establishing a first said site along the vertical axis of a borehole extending down from the surface of the earth;
    establishing a second said site at a location remote from said borehole;
    establishing a multiplicity of electrode sites, including said first and second sites;
    establishing and maintaining an electric current between electrodes positioned at any two of said sites at a given time;
    determining the electric potential difference between other pairs of said sites in a pattern which accumulates redundant data concerning the resistivity or induced polarization of the earth in the subsurface region between and about said sites; and
    processing said redundant data to construct a model of the resistivity or induced polarization of individual cells within said region.

5. A method according to claim 4 wherein an electric current is first established between a selected pair of electrodes positioned at two of said sites and the electric potential different is determined between pairs of other said sites after which an electric current is maintained between two other said sites and the electric potential difference between other remaining pairs of said sites is determined.

6. A method according to claim 5 wherein the location of current electrodes is moved among various of said electrode sites and after such relocation of current electrodes the potential difference between the remaining pairs of said sites is determined, thereby to accumulate redundant data concerning the resistivity or induced polarization of the earth between a multiplicity of combinations of locations of current electrodes and potential electrodes among said sites.

7. A method according to claim 1 wherein said subsurface region is energized by means of a magnetic field transmitter located at a said site, and said transmitter is operated while the resulting magnetic or electric field is measured at other said sites.

8. A method according to claim 1 comprising:
    establishing a first site along the vertical axis of a borehole extending down from the surface of the earth;
    establishing a second site at a location remote from said borehole;
    establishing a multiplicity of sites, including said first and second sites;
    inducing and maintaining a magnetic or electric field by means of a magnetic field source positioned at one of said sites during a given time interval;
    measuring the resulting fields at other of said sites during said time interval in a pattern which accumulates redundant data concerning the resistivity or induced polarization of the earth in the subsurface region between and about said sites; and
    processing said redundant data to construct a model of the resistivity or induced polarization of individual cells within said region.

9. A method according to claim 8 wherein a field is first generated at a selected one of said sites and the resulting fields are measured at other of said sites, after which a second field is generated at another of said sites, and the resulting fields at other of said sites are measured.

10. A method according to claim 9 wherein fields are generated in sequence at various of said sites, and in each instance the resulting fields at the remaining of said sites are measured, thereby to accumulate redundant data concerning the resistivity or induced polarization of the earth between a multiplicity of combinations of transmitter and receiver sites through said subsurface region.

11. A method of surface-to-borehole geophysical surveying, comprising:
    establishing a pair of current electrodes at the surface of the earth in the vicinity of a borehole;
    establishing a pair of potential electrodes, at least one of which is located along the axis of a borehole extending from the surface of the earth;
    establishing a multiplicity of electrode sites on or beneath the surface of the earth, thereby providing a number of different pair combinations of electrode sites greater than a selected number of subsurface cells of differing resistivity values;
    establishing and maintaining a known electric current between said pair of current electrodes, while measuring the potential difference between each of said multiplicity of pairs of electrode sites, thereby accumulating a mass of overdetermined redundant data; and
    mathematically inverting said redundant data to determine the shapes or resistivities of said cells, whereby to construct a model corresponding to the resistivity values or the induced polarization values of said cells of differing resistivity.

12. A method according to claim 11 wherein one of said current electrodes is located remote from said borehole.

13. A method according to claim 11 wherein one potential electrode is located at the surface and remote from the borehole.

14. A method according to claim 11 wherein one current electrode and one potential electrode are each positioned at locations on the surface and remote from the borehole.

15. The method of borehole-to-surface geophysical surveying, comprising:
    establishing a pair of potential electrodes at the surface of the earth in the vicinity of a borehole;
    establishing a pair of current electrodes, at least one of which is located along the axis of a borehole extending from the surface of the earth;
    establishing a multiplicity of electrode sites on or beneath the surface of the earth, thereby providing a number of different pair combinations of electrode sites greater than a selected number of subsurface cells of differing resistivity values;
    establishing and maintaining a known electric current between said pair of current electrodes, while measuring the potential difference between each of said multiplicity of pairs of electrode sites, thereby accumulating a mass of overdetermined redundant data; and
    mathematically inverting said redundant data to determine the shapes or resistivities of said cells, whereby to construct a model consisting of the resistivity values or the induced polarization values of said cells of different resistivity.

16. A method according to claim 15 wherein one of said potential electrodes is located remote from said borehole.

17. A method according to claim 15 wherein one current electrode is located at the surface and remote from the borehole.

18. A method according to claim 15 wherein one current electrode and one potential electrode are each positioned at locations on the surface and remote from the borehole.

19. The method of borehole-to-borehole geophysical surveying, comprising:
    establishing a pair of current electrodes, at least one of which is located along the axis of a first borehole extending from the surface of the earth;
    establishing a pair of potential electrodes, at least one of which is located along the axis of a second borehole extending from the surface of the earth, and in the vicinity of the first borehole;
    establishing a multiplicity of electrode sites on or beneath the surface of the earth, thereby providing a number of different pair of combinations of electrode sites greater than a selected number of subsurface cells of differing resistivity values;
    establishing and maintaining a known electric current between said pair of current electrodes, while measuring the potential difference between each of the multiplicity of pairs of electrode sites, thereby accumulating a mass of overdetermined redundant data; and
    mathematically inverting said redundant data to determine the shapes or resistivities of said cells, whereby to construct a model consisting of the resisitivity values or the induced polarization values of said cells of differing resistivity.

20. A method according to claim 19 wherein one of said current electrodes is located at the surface and remote from said boreholes.

21. A method according to claim 19 wherein one of said potential electrodes is located at the surface and remote from said boreholes.

22. A method according to claim 19 wherein one current electrode and one potential electrode are each positioned at locations on the surface and remote from said boreholes.

* * * * *

UNITED STATES PATENT OFFICE
CERTIFICATE OF CORRECTION

Patent No. 4,875,015            Dated OCTOBER 17, 1989

Inventor(s) STANLEY H. WARD

It is certified that error appears in the above-identified patent and that said Letters Patent is hereby corrected as shown below:

In column 1, line 19 delete "This application is a continuation-in-part of commonly assigned Ser. No. 75,690, filed July 20, 1987, (now abandoned) the disclosure of which is incorporated herein."

In column 6, line 50 after the, insert --formulation--.

In column 6, line 62, after cross-borehole, insert --resistivity--.

In column 7, line 2, after effect, insert --measurements--.

Signed and Sealed this

Eleventh Day of September, 1990

Attest:

HARRY F. MANBECK, JR.

*Attesting Officer*      *Commissioner of Patents and Trademarks*